US009665796B2

(12) United States Patent
Lackey et al.

(10) Patent No.: US 9,665,796 B2
(45) Date of Patent: May 30, 2017

(54) SYSTEM AND METHOD FOR VISUAL CORRELATION OF DIGITAL IMAGES

(71) Applicant: University of Central Florida Research Foundation, Inc., Orlando, FL (US)

(72) Inventors: Stephanie Lackey, Orlando, FL (US); Joseph Fanfarelli, Port Orange, FL (US); Eric Ortiz, Deltona, FL (US); Daniel Barber, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 396 days.

(21) Appl. No.: 14/451,013

(22) Filed: Aug. 4, 2014

(65) Prior Publication Data
US 2016/0364876 A1 Dec. 15, 2016

Related U.S. Application Data

(63) Continuation-in-part of application No. 14/161,155, filed on Jan. 22, 2014, now abandoned.
(Continued)

(51) Int. Cl.
*G06K 9/34* (2006.01)
*G06K 9/62* (2006.01)
(Continued)

(52) U.S. Cl.
CPC ......... *G06K 9/6202* (2013.01); *G06K 9/4642* (2013.01); *G06T 7/11* (2017.01);
(Continued)

(58) Field of Classification Search
USPC ........ 382/173, 170, 254, 274; 345/428, 590; 348/364, 370, 407.1, 413.1; 358/418, 452
See application file for complete search history.

(56) References Cited

U.S. PATENT DOCUMENTS

| 5,724,456 A * | 3/1998 | Boyack | G06T 5/009 345/428 |
| 8,194,992 B2 * | 6/2012 | Marchesotti | G06K 9/00234 358/452 |

(Continued)

OTHER PUBLICATIONS

Chou and Li. A perceptually tuned subband image coder based on the measure of just-noticeable-distortion profile. IEEE Transactions on Circuits and Systems for Video Technology. 1995. vol. 5 (No. 6): 467-476.

(Continued)

*Primary Examiner* — Anh Do
(74) *Attorney, Agent, or Firm* — Molly L. Sauter; Smith & Hopen, P.A.

(57) ABSTRACT

A system and method for determining if a first image and a second image are correlated images includes partitioning a first image and a second image into a plurality of corresponding pixel partitions, calculating an average luminance value for each of the plurality of pixel partitions, determining if each of the plurality of pixel partitions of the first image is correlated with each of the corresponding plurality of pixel partitions of the second image, calculating a percentage of correlated pixel partitions of the first image and the corresponding plurality of pixel partitions of the second image and determining that the first image and the second image are correlated images if the percentage of correlated pixel partitions exceeds a predetermined pixel partition correlation threshold. The objective metric of the present invention determines whether two static rendered images are correlated enough to be undetectable by a human observer.

20 Claims, 6 Drawing Sheets

Related U.S. Application Data

(60) Provisional application No. 61/755,172, filed on Jan. 22, 2013.

(51) Int. Cl.
*G06K 9/46* (2006.01)
*G06T 7/11* (2017.01)
*G06T 7/136* (2017.01)

(52) U.S. Cl.
CPC ...... *G06T 7/136* (2017.01); *G06K 2009/6213* (2013.01); *G06T 2207/30212* (2013.01)

(56) References Cited

U.S. PATENT DOCUMENTS

| | | | | |
|---|---|---|---|---|
| 8,254,677 | B2 * | 8/2012 | Abe | H04N 19/14 348/402.1 |
| 8,773,577 | B2 * | 7/2014 | Velarde | H04N 5/232 348/364 |

OTHER PUBLICATIONS

Schiavone et al., Terrain database interoperability issues in training with distributed interactive simulation. ACM Transactions on Modeling and Computer Simulation. 1997. vol. 7 (No. 3): 332-367.

Vujovix., Experimental results on visibility threshold in human visual perception for application in image/video coding and quality assessment. Proceedings of IEEE Region 8 International Symposium on Video / Image Processing and Multimedia Communications. Jun. 16-19, 2002: 141-146.

\* cited by examiner

| Image Pair ID | Mean | St.Dev. |
|---|---|---|
| 1 | 3.89 | 1.01 |
| 2 | 4.31 | 0.82 |
| 3 | 3.03 | 0.70 |
| 4 | 3.14 | 0.87 |
| 5 | 2.83 | 0.81 |
| 6 | 2.83 | 0.81 |
| 7 | 3.56 | 1.00 |
| 8 | 4.94 | 0.23 |
| 9 | 4.92 | 0.28 |
| 10 | 3.39 | 0.73 |
| 11 | 3.50 | 0.65 |
| 12 | 3.56 | 0.56 |
| 13 | 4.78 | 0.59 |
| 14 | 4.83 | 0.51 |
| 15 | 4.22 | 0.80 |
| 16 | 4.89 | 0.32 |
| 17 | 3.25 | 1.13 |
| 18 | 4.83 | 0.38 |
| 19 | 3.11 | 0.92 |
| 20 | 3.08 | 0.81 |

Fig. 4

SYSTEM AND METHOD FOR VISUAL CORRELATION OF DIGITAL IMAGES

CROSS REFERENCE TO RELATED APPLICATIONS

This application is a Continuation-in-Part of U.S. patent application Ser. No. 14/161,155, filed Jan. 22, 2014 now abandoned, which claims priority to U.S. Provisional Patent Application No. 61/755,172, filed Jan. 22, 2013, both of which are incorporated herein by reference.

STATEMENT OF GOVERNMENT INTEREST

This invention was made with government support under the U.S. Army Research, Development and Engineering Command #W91CRB08D0015. The government has certain rights in the invention.

BACKGROUND OF THE INVENTION

The military training community utilizes Simulation-Based Training (SBT) to close the gap between classroom-based training and live combat training. SBT typically includes some combination of live (e.g., real tanks and dismounted infantry), virtual (e.g., a live soldier interacting with a tank simulator) and constructive (e.g., fully or semi-autonomous simulated tanks) entities. The various training methods commonly interact with each other within an LVC (Live, Virtual, Constructive) network architecture.

The primary sensory cue indicator in a visual system simulation is the fidelity or "look" of the environment. Due to the importance of fidelity, understanding the levels of interoperability a system maintains is imperative. Interoperability, succinctly defined, is the ability of multiple systems to find a common ground or work together in a coupled environment. Standardization designs across simulators have been developed to support interoperation. However, the differences in individual image generation software (e.g., rendering engines, polygonalization, thinning) of various manufacturers makes it difficult to produce a standardized "fidelity" between applications. Furthermore, proprietary application information is a key factor that limits standardization due to individual manufacturers permitting database correlation or synthesis but prohibiting uniform image generation processes.

Traditionally, correlation and interoperability between two simulation systems is determined by Terrain Database (TDB) correlation methods and/or human visual inspection. TDB correlation methods choose random, corresponding points within the TDB and then perform a numeric comparison(s) of these points. However, there are limitations to using this prior art method. TDB correlation does not assess the images generated, but instead utilizes the underlying data created by image generators. Therefore, differing, which is often proprietary, polygonalization, thinning and rendering algorithms are used and the differences in hardware and software capabilities are excluded from TDB comparisons. Therefore, while a TDB correlation system may conclude that the two images are correlated, the image that each individual trainee actually observes may be very different, depending upon the differences between the two image generators.

In human visual inspection, a direct comparison of generated images is performed by human inspection and is employed in one of two ways. The first involves the use of a side-by-side viewer to subjectively inspect a particular location of interest. Alternatively, in human visual inspection, a human observer may view several, co-located simulation platforms simultaneously to subjectively determine if the visuals presented on each computer display are correlated. However, neither of these approaches objectively measures the rendered images presented to the trainee, nor do they fully explore automated assessment capabilities.

Moreover, it is important to acknowledge the global impact of poor correlation within the LVC (Live, Virtual, Constructive) network architecture paradigm commonly employed in simulation-based training. A trainee operating a virtual asset that communicates with a trainee on the range must also be able to rely upon the validity of his/her visual display to ensure fair fight as well as safety.

Accordingly, what is needed in the art is a system and method capable of objectively assessing rendered images in an automated fashion to identify correlation between the images.

SUMMARY OF INVENTION

In accordance with the present invention, a method for determining if a first image and a second image are correlated images is provided. The method includes partitioning a first image, comprising a plurality of pixels, into a plurality of corresponding pixel partitions, each of the plurality of pixel partitions comprising a predetermined number of pixels, partitioning a second image, comprising a plurality of pixels, into a plurality of corresponding pixel partitions, each of the plurality of pixel partitions comprising a predetermined number of pixels. After the images are partitioned, the method further includes calculating an average luminance value for each of the plurality of pixel partitions of the first image and calculating an average luminance value for each of the plurality of pixel partitions of the second image. After the average luminance values are calculated, the method further includes determining if each of the plurality of pixel partitions of the first image is correlated with each of the corresponding plurality of pixel partitions of the second image and calculating a percentage of correlated pixel partitions of the plurality of pixel partitions of the first image and the corresponding plurality of pixel partitions of the second image. Based upon the percentage of correlated pixel partitions that is calculated, the method then continues by determining that the first image and the second image are correlated images if the percentage of correlated pixel partitions exceeds a predetermined pixel partition correlation threshold.

In an additional embodiment, the method of the present invention may be embodied in a non-transitory computer-readable media having computer-executable instructions for performing a method of running a software program on a computing device for determining if a first image and a second image are correlated images, the computing device operating under an operating system, the method including issuing instructions from the software program to perform the method of the present invention which includes partitioning a first image, comprising a plurality of pixels, into a plurality of corresponding pixel partitions, each of the plurality of pixel partitions comprising a predetermined number of pixels, partitioning a second image, comprising a plurality of pixels, into a plurality of corresponding pixel partitions, each of the plurality of pixel partitions comprising a predetermined number of pixels. After the images are partitioned, the method further includes calculating an average luminance value for each of the plurality of pixel partitions of the first image and calculating an average luminance value for each of the plurality of pixel partitions of the second image. After the average luminance values are calculated, the method further includes determining if each of the plurality of pixel partitions of the first image is correlated with each of the corresponding plurality of pixel partitions of the second image and calculating a percentage of correlated pixel partitions of the plurality of pixel partitions of the first image and the corresponding plurality of pixel partitions of the second image. Based upon the percentage of correlated pixel partitions that is calculated, the method then continues by determining that the first image and the second image are correlated images if the percentage of correlated pixel partitions exceeds a predetermined pixel partition correlation threshold.

In an additional embodiment, the present invention includes a simulation-based training (SBT) system for determining if a first image and a second image are correlated images, the SBT system comprising one or more non-transitory computer-readable media having computer-executable instructions for performing a method of running a software program on a computing device for determining if a first image and a second image are correlated images, the computing device operating under an operating system, the method including issuing instructions from the software program to perform the method of the present invention which includes partitioning a first image, comprising a plurality of pixels, into a plurality of corresponding pixel partitions, each of the plurality of pixel partitions comprising a predetermined number of pixels, partitioning a second image, comprising a plurality of pixels, into a plurality of corresponding pixel partitions, each of the plurality of pixel partitions comprising a predetermined number of pixels. After the images are partitioned, the method further includes calculating an average luminance value for each of the plurality of pixel partitions of the first image and calculating an average luminance value for each of the plurality of pixel partitions of the second image. After the average luminance values are calculated, the method further includes determining if each of the plurality of pixel partitions of the first image is correlated with each of the corresponding plurality of pixel partitions of the second image and calculating a percentage of correlated pixel partitions of the plurality of pixel partitions of the first image and the corresponding plurality of pixel partitions of the second image. Based upon the percentage of correlated pixel partitions that is calculated, the method then continues by determining that the first image and the second image are correlated images if the percentage of correlated pixel partitions exceeds a predetermined pixel partition correlation threshold.

BRIEF DESCRIPTION OF THE DRAWINGS

For a fuller understanding of the invention, reference should be made to the following detailed description, taken in connection with the accompanying drawings, in which:

FIG. 4 is a table showing an experimental sample of average HITL correction levels for image pairs.

DETAILED DESCRIPTION OF THE INVENTION

The present invention provides a quantitative, automated system and method for assessing the correlation level of two rendered images. Thus, it removes subjectivity from such evaluation. The method of the present invention has been calibrated using results from human-in-the-loop experimentation. The performance of this method is optimized based upon the capabilities and limitations of the human visual system. Therefore, the resulting assessments are not overly sensitive and reduce the resources required to assess rendered images within a networked simulation environment. Additionally, the simplicity of the method lends itself to implementation within existing and emerging simulation systems with relatively little effort compared to current assessment methods.

The objective metric of the present invention determines whether two static images are correlated enough to be undetectable by a human observer. The measurement algorithm developed is suitable for implementation in software. The system and method of the present invention provide benefits to multiple organizations, such as those engaged in human-in-the-loop simulators, distributed learning, and training applications.

Figure 1:
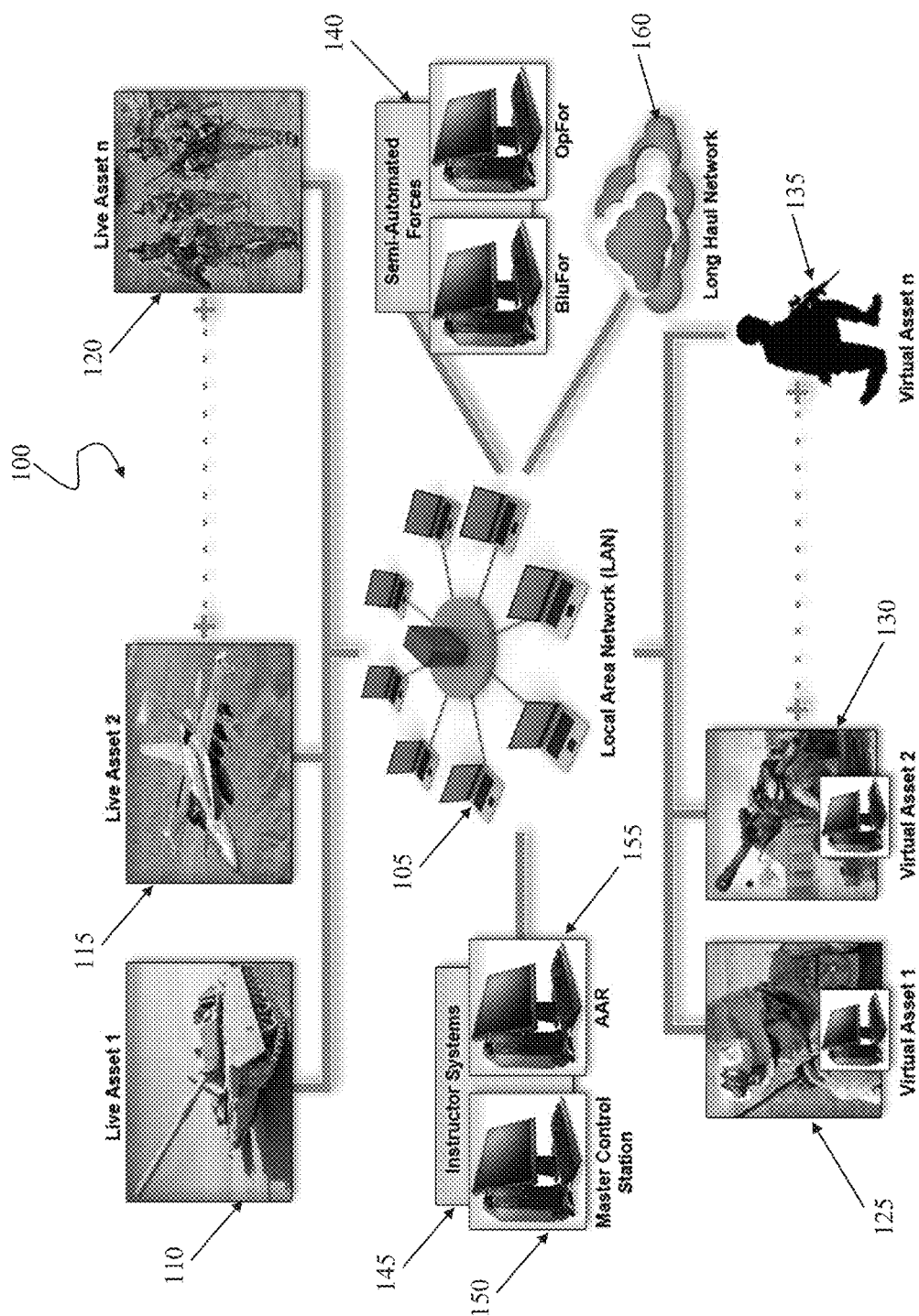
FIG. 1 is a diagram illustrating a typical LVC Network Architecture in accordance with an embodiment of the present invention.

FIG. 1 illustrates a typical LVC (Live, Virtual, Constructive) network architecture 100. The Local Area Network (LAN) 105 at the core of the architecture 100 reaches out to all the other elements in the LVC network 100. Live assets 110, 115, 120 operating on the range may be integrated into the network 100 as dictated by training requirements. Virtual assets 125, 130, 135 representing individual (and group were applicable) roles performed on simulated platforms (e.g., communications, fire support) may also be integrated into the network 100. Semi-Automated Forces (SAF) systems 140 providing constructive friendly and enemy entities may be included in the LVC network 100. Instructor systems and support tools 145, such as a master control station 150 and After-Action Review (AAR) console(s) 155 may additionally be linked to control, observe, and debrief training events. As shown in FIG. 1, the LAN 105 connects the local assets to distributed sites via a long haul network gateway 160. The complex interaction between LVC training elements requires careful planning, implementation, and execution. Interoperability plays a central role in the success of SBT (Simulation-Based Training) and LVC (Live, Virtual, Constructive) training.

Evidence from the SBT (Simulation-Based Training) and LVC (Live, Virtual, Constructive) network architecture communities indicates a need to extend the efforts of terrain database correlation to visual correlation. For example, it has been shown that two trainees performing a ground exercise utilizing the same simulator located in close proximity within the simulated terrain and within substantially the same timeframe, may not experience the same visual scene.

Figure 2A:
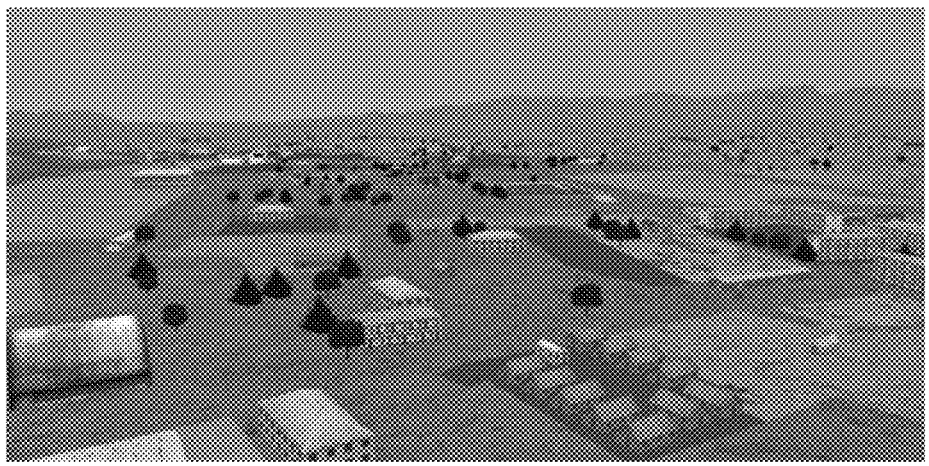
FIG. 2A is an exemplary rendered image of a landscape, including mountains.
Figure 2B:
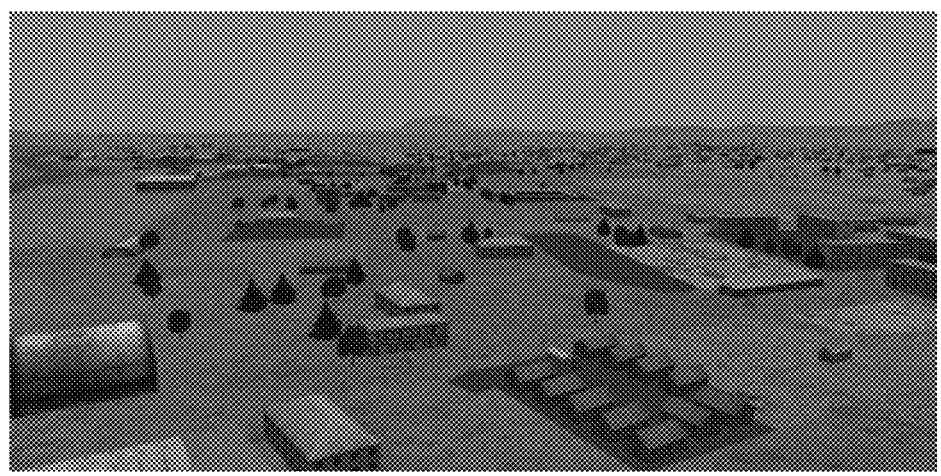
FIG. 2B is an exemplary rendered image of landscape, omitting mountains.

For example, a comparison of FIG. 2A and FIG. 2B illustrates the types of differences commonly described by soldiers during the simulation training, including: (1) differing brightness levels (FIG. 2A appearing brighter than FIG. 2B) and (2) mountains appearing on the console of one trainee (FIG. 2A), but not on the console of the other trainee (FIG. 2B). These visual differences may prove problematic if entities arrive on the scene from the horizon or with general coordination and situation awareness when soldiers interact solely through radio communications.

Figure 3:
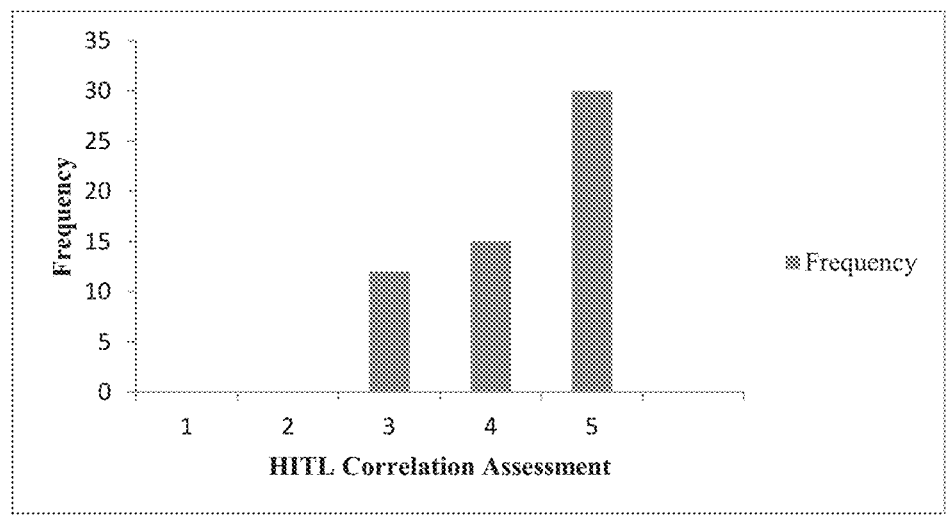
FIG. 3 is a frequency chart illustrating an experimental average HITL (Human-in-the-loop) correlation assessment levels.

In accordance with the present invention, in order to baseline visual correlation thresholds based on the human visual system, a Human-In-The-Loop (HITL) experiment was conducted. The stimuli for the baseline consisted of several dozen pairs of images from a variety of military simulation systems. Each image of the pair of images was generated on one of two consoles at substantially the same time and at substantially the same location within the same terrain database (see FIGS. 2A and 2B). Following the Human-In-The-Loop (HITL) experiment, participants were asked to rate the level of correlation on a scale of 1 to 5, with 5 indicating perfect correlation. The chart presented in FIG. 3 shows summary statistics in the form of a frequency chart of the average correlation level for each of the 57 image pairs presented as assessed by human participants in the Human-In-The-Loop (HITL) experiment. The chart shows that, on average, participants found the image pairs to be at least somewhat correlated (i.e., rating of 3). The table presented in FIG. 4 shows the mean correlation level and standard deviation for 20 of the image pairs presented to the participants in the experiment.

These results from the Human-In-The-Loop (HITL) experiment were used to develop a threshold for acceptable correlation and the pairs of images were compared based on two different automated methods. The first automated method compared the images at the pixel level and the second automated method separated each image into a minimum of 30 partitions (to support statistical analyses). The comparative results were used to develop a minimum threshold metric for image correlation that is presented below. The objective for developing the metric is to facilitate the development of a standard that can be evaluated via automated means rather than requiring a subjective human assessment. The objective metric of the present invention determines whether two static images are correlated enough to be undetectable by a human observer. The measurement algorithm developed is suitable for implementation in software.

Given that two images (such as the images in FIGS. 2A and 2B) Image1 and Image2 are each divided into a matrix of corresponding pixel partitions of the following dimensions (height×width): 49×49 or 23×23, then for C≥0.49, Image1 and Image2 are considered correlated, such that:

$$\Delta_i = |I_{(x,y)1} - I_{(x,y)2}|$$

$$\Delta_i \leq 1 \rightarrow C_i = 1$$

$$\Delta_i > 1 \rightarrow C_i = 0$$

$$C = \frac{\sum_{i=1}^{n} C_i}{N}$$

Where: C=percent correlation between two images
Ci=percent correlation between two partitions
Δi=difference between luminance values for image pair i
I(x,y)=luminance value for partition (x,y)
N=number of partitions In essence, if at least 49% of the average luminance values of the partitions for a given pair of images are correlated, then the two images can be considered correlated.

Luminance, as represented by Y in the literature, can be calculated from RGB values as:

$$Y = 0.2126R + 0.7152G + 0.0722B$$

Figure 5A:
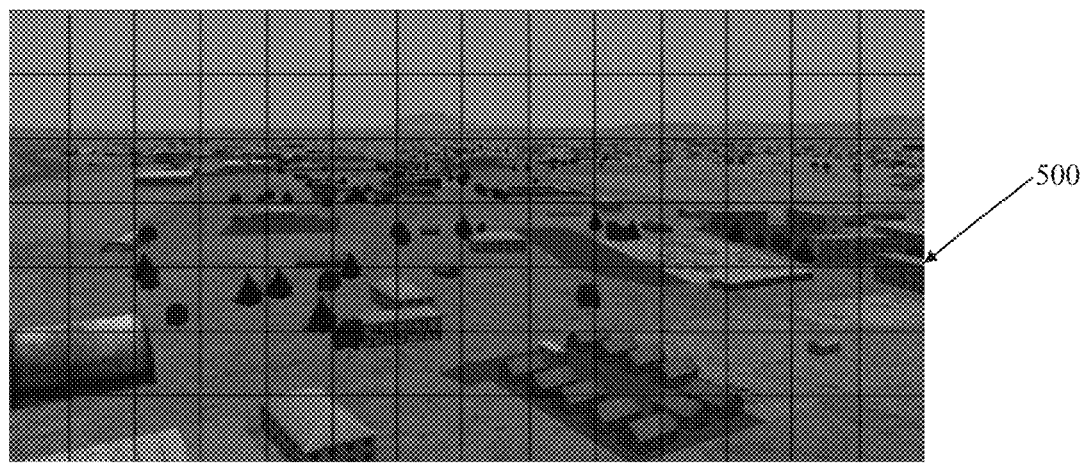
FIG. 5A is an exemplary rendered image of a landscape including mountains, separated into partitions, in accordance with an embodiment of the present invention.
Figure 5B:
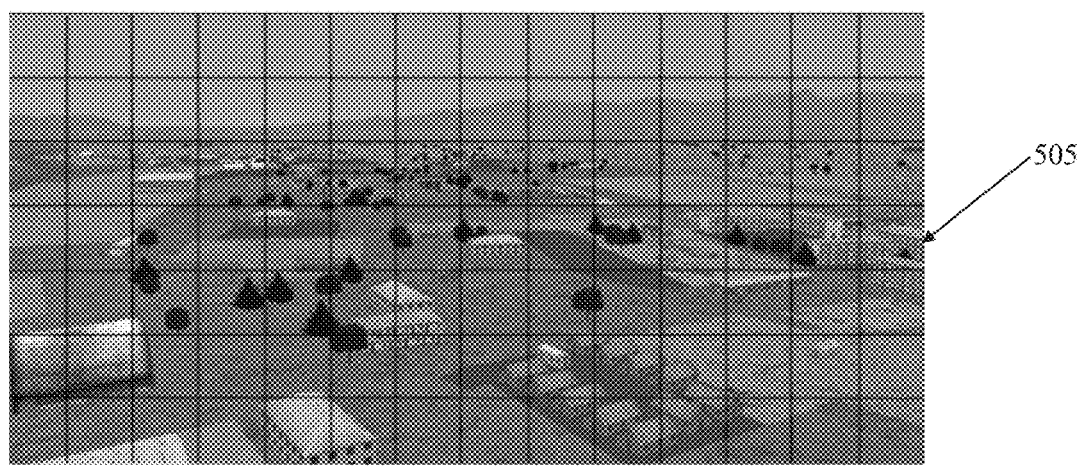
FIG. 5B is an exemplary rendered image of a landscape omitting mountains, separated into partitions, in accordance with an embodiment of the present invention.

With reference to FIG. 5, in operation of an exemplary embodiment, the images of FIGS. 2A (Image1) and 2B (Image2) are divided into the same number of pixel partitions, each pixel partition having the same number of pixels, as shown with reference to FIGS. 5A and 5B. As such, each pixel partition in FIG. 5A has a corresponding pixel partition in FIG. 5B. After partitioning the images into pixel partitions, the average luminance of each pixel partition is determined by calculating the luminance value for each of the pixels in the partition and then finding the average luminance value for all of the pixels in each pixel partition.

In an exemplary embodiment, the difference between the average luminance value of each pixel partition of Image1 is compared to the average luminance value of the corresponding pixel partition of Image2. If there is a difference between the average luminance value of a pixel partition of Image1, compared to the average luminance value of the corresponding pixel partition of Image2, the percent correlation between the two corresponding pixel partitions is assigned a first value. In a particular embodiment, the first value assigned is a "1". If a difference is not detected in the average luminance value between the two corresponding pixel partitions, the percent correlation between the two pixel partitions is assigned a second value. In a particular embodiment, the second value assigned is a "0". In this exemplary embodiment, after each of the corresponding pixel partitions in the two images have been compared to each other, an average of the percent correlation of the individual pixel partitions is calculated to determine the percentage of correlated pixel partitions between Image1 and Image2 and if the percentage of correlated pixel partitions is at least 49%, it is determined that the Image1 and Image2 are considered to correlated enough such that the differences are undetectable to a human observer.

Figure 6:
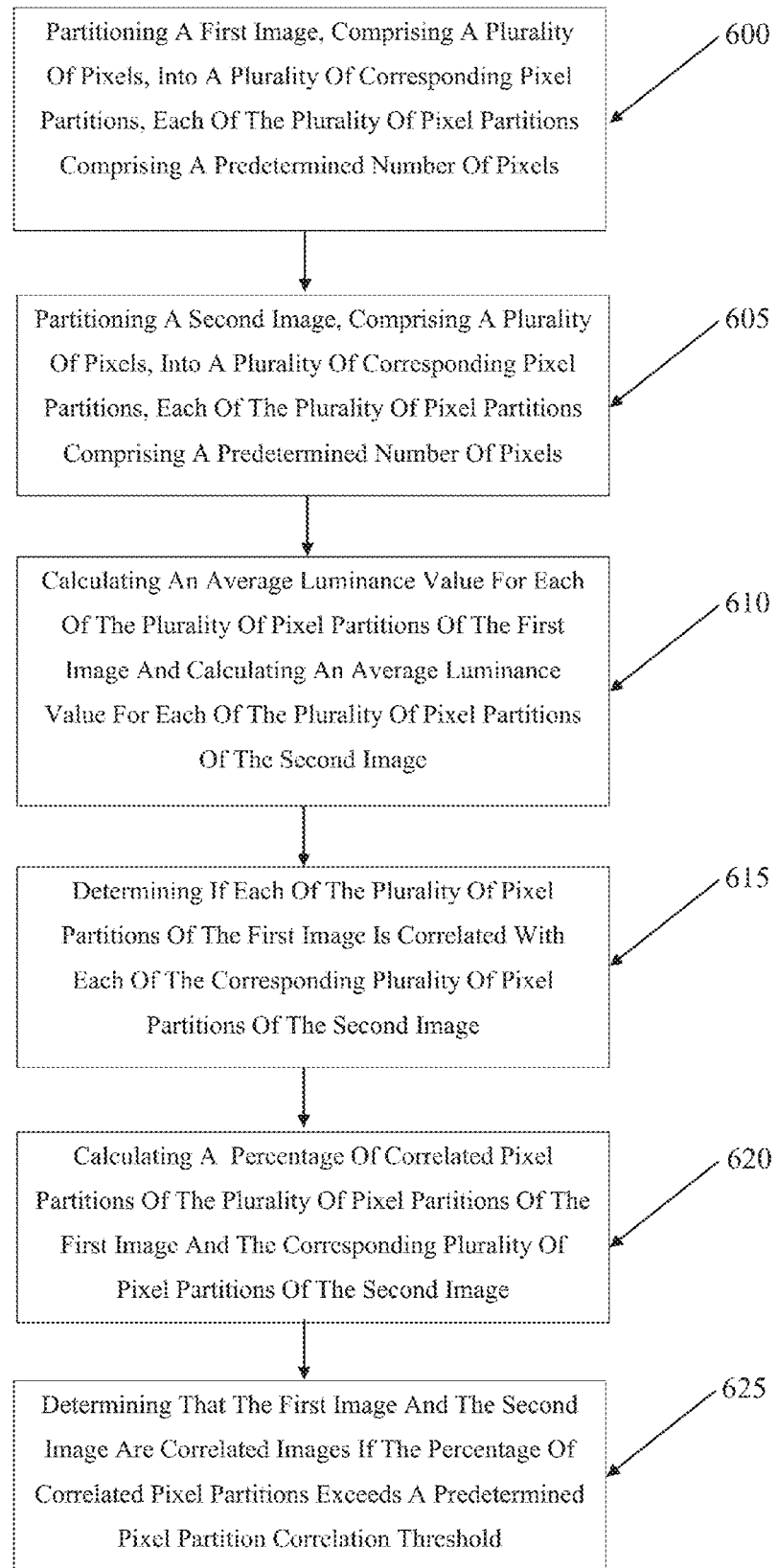
FIG. 6 is a flow diagram illustrating a method for determining if a first image and a second image are correlated images in accordance with an embodiment of the present invention.

With reference to FIG. 6, in an exemplary embodiment, the method of the present invention includes partitioning a first image, comprising a plurality of pixels, into a plurality of corresponding pixel partitions, each of the plurality of pixel partitions comprising a predetermined number of pixels 600. The method further includes, partitioning a second image, comprising a plurality of pixels, into a plurality of corresponding pixel partitions, each of the plurality of pixel partitions comprising a predetermined number of pixels 605. After the images are partitioned, the method proceeds by calculating an average luminance value for each of the plurality of pixel partitions of the first image and calculating an average luminance value for each of the plurality of pixel partitions of the second image 610. Following the calculation of the average luminance value for each of the plurality of pixel partitions, the method further includes, determining if each of the plurality of pixel partitions of the first image is correlated with each of the corresponding plurality of pixel partitions of the second image 615. The method then calculates a percentage of correlated pixel partitions of the plurality of pixel partitions of the first image and the corresponding plurality of pixel partitions of the second image 620 and determines that the first image and the second image are correlated images if the percentage of correlated pixel partitions exceeds a predetermined pixel partition correlation threshold 625.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for determining if a first image and a second image are correlated images, the method comprising:

partitioning a first image displayed on a first training simulator into a plurality of corresponding pixel partitions, the first image comprising a plurality of pixels and each of the plurality of pixel partitions comprising a predetermined number of pixels;

partitioning a second image displayed on a second training simulator into a plurality of corresponding pixel partitions, the second image comprising a plurality of pixels and each of the plurality of pixel partitions comprising a predetermined number of pixels, wherein the first training simulator and the second training simulator are connected to a local area network (LAN);

calculating an average luminance value for each of the plurality of pixel partitions of the first image displayed on a first training simulator;

calculating an average luminance value for each of the plurality of pixel partitions of the second image displayed on a second training simulator;

determining if each of the plurality of pixel partitions of the first image displayed on a first training simulator is correlated with each of the corresponding plurality of pixel partitions of the second image displayed on a second training simulator;

calculating percentage of correlated pixel partitions of the plurality of pixel partitions of the first image displayed on a first training simulator and the corresponding plurality of pixel partitions of the second image displayed on a second training simulator; and determining that the first image displayed on a first training simulator and the second image displayed on a second training simulator are correlated images if the percentage of correlated pixel partitions exceeds a predetermined pixel partition correlation threshold.

2. The method of claim 1, wherein partitioning a first image displayed on a first training simulator into a plurality of corresponding pixel partitions and partitioning a second image displayed on a second training simulator into a plurality of corresponding pixel partitions further comprises, partitioning the first image and the second image into a 49×49 matrix or a 23×23 matrix of pixel partitions.

3. The method of claim 1, wherein the predetermined number of pixels in each of the plurality of pixel partitions is an equal number of pixels.

4. The method of claim 1, wherein calculating an average luminance value for each of the plurality of pixel partitions of the first image displayed on a first training simulator further comprises:
   calculating a pixel luminance value for each of the pixels in each of the plurality of pixel partitions of the first image displayed on a first training simulator; and
   calculating the average luminance value for each of the plurality of pixel partitions of the first image displayed on a first training simulator as equal to the sum of the pixel luminance values of the pixels in the pixel partition divided by the predetermined number of pixels in the pixel partition.

5. The method of claim 1, wherein calculating an average luminance value for each of the plurality of pixel partitions of the second image displayed on a second training simulator further comprises:
   calculating a pixel luminance value for each of the pixels in each of the plurality of pixel partitions of the second image displayed on a second training simulator; and
   calculating the average luminance value for each of the plurality of pixel partitions of the second image displayed on a second training simulator as equal to the sum of the pixel luminance values of the pixels in the pixel partition divided by the predetermined number of pixels in the pixel partition.

6. The method of claim 1, wherein determining if each of the plurality of pixel partitions of the first image displayed on a first training simulator is correlated with each of the corresponding plurality of pixel partitions of the second image displayed on a second training simulator further comprises:
   comparing the average luminance value of each of the plurality of pixel partitions of the first image displayed on a first training simulator with the average luminance value of each of the corresponding plurality of pixel partitions of the second image displayed on a second training simulator; and
   assigning a first percent correlation value to the pixel partition if a difference is detected in the comparison of the average luminance values and assigning a second percent correlation value to the pixel partition if a difference is not detected in the comparison of the average luminance values.

7. The method of claim 1, wherein the predetermined pixel partition correlation threshold is about 49%.

8. One or more non-transitory computer-readable media having computer-executable instructions for performing a method of running a software program on a computing device for determining if a first image and a second image are correlated images, the computing device operating under an operating system, the method including issuing instructions from the software program comprising:
   communicatively accessing the operating system of the computing device;
   partitioning a first image displayed on a first training simulator into a plurality of corresponding pixel partitions, the first image comprising a plurality of pixels and each of the plurality of pixel partitions comprising a predetermined number of pixels;
   partitioning a second image displayed on a second training simulator into a plurality of corresponding pixel partitions, the second image comprising a plurality of pixels and each of the plurality of pixel partitions comprising a predetermined number of pixels, wherein the first training simulator and the second training simulator are connected to a local area network (LAN);
   calculating an average luminance value for each of the plurality of pixel partitions of the first image displayed on a first training simulator;
   calculating an average luminance value for each of the plurality of pixel partitions of the second image displayed on a second training simulator;
   determining if each of the plurality of pixel partitions of the first image displayed on a first training simulator is correlated with each of the corresponding plurality of pixel partitions of the second image displayed on a second training simulator;
   calculating a percentage of correlated pixel partitions of the plurality of pixel partitions of the first image displayed on a first training simulator and the corresponding plurality of pixel partitions of the second image displayed on a second training simulator; and
   determining that the first image displayed on a first training simulator and the second image displayed on a second training simulator are correlated images if the percentage of correlated pixel partitions exceeds a predetermined pixel partition correlation threshold.

9. The media of claim 8, wherein partitioning a first image displayed on a first training simulator into a plurality of corresponding pixel partitions and partitioning a second image displayed on a second training simulator into a plurality of corresponding pixel partitions further comprises, partitioning the first image and the second image into a 49×49 matrix or a 23×23 matrix of pixel partitions.

10. The media of claim 8, wherein the predetermined number of pixels in each of the plurality of pixel partitions is an equal number of pixels.

11. The media of claim 8, wherein calculating an average luminance value for each of the plurality of pixel partitions of the first image displayed on a first training simulator further comprises:
   calculating a pixel luminance value for each of the pixels in each of the plurality of pixel partitions of the first image displayed on a first training simulator; and
   calculating the average luminance value for each of the plurality of pixel partitions of the first image displayed on a first training simulator as equal to the sum of the pixel luminance values of the pixels in the pixel partition divided by the predetermined number of pixels in the pixel partition.

12. The media of claim 8, wherein calculating an average luminance value for each of the plurality of pixel partitions of the second image displayed on a second training simulator further comprises:
   calculating a pixel luminance value for each of the pixels in each of the plurality of pixel partitions of the second image displayed on a second training simulator; and
   calculating the average luminance value for each of the plurality of pixel partitions of the second image displayed on a second training simulator as equal to the sum of the pixel luminance values of the pixels in the pixel partition divided by the predetermined number of pixels in the pixel partition.

13. The media of claim 8, wherein determining if each of the plurality of pixel partitions of the first image displayed on a first training simulator is correlated with each of the corresponding plurality of pixel partitions of the second image simulator further comprises:

comparing the average luminance value of each of the plurality of pixel partitions of the first image displayed on a first training simulator with the average luminance value of each of the corresponding plurality of pixel partitions of the second image displayed on a second training simulator; and assigning a first percent correlation value to the pixel partition if a difference is detected in the comparison of the average luminance values and assigning a second percent correlation value to the pixel partition if a difference is not detected in the comparison of the average luminance values.

14. The media of claim 8, wherein the predetermined pixel partition correlation threshold is about 49%.

15. A simulation-based training (SBT) system for determining if a first image and a second image are correlated images, the SBT system comprising one or more non-transitory computer-readable media having computer-executable instructions for performing a method of running a software program on a computing device for determining if a first image and a second image are correlated images, the computing device operating under an operating system, the method including issuing instructions from the software program comprising:

communicatively accessing the operating system of the computing device;

partitioning a first image displayed on a first training simulator into a plurality of corresponding pixel partitions, the first image comprising a plurality of pixels and each of the plurality of pixel partitions comprising a predetermined number of pixels;

partitioning a second image displayed on a second training simulator into a plurality of corresponding pixel partitions, the second image comprising a plurality of pixels and each of the plurality of pixel partitions comprising a predetermined number of pixels wherein the first training simulator and the second training simulator are connected to a local area network (LAN);

calculating an average luminance value for each of the plurality of pixel partitions of the first image displayed on a first training simulator;

calculating an average luminance value for each of the plurality of pixel partitions of the second image displayed on a second training simulator;

determining if each of the plurality of pixel partitions of the first image displayed on a first training simulator is correlated with each of the corresponding plurality of pixel partitions of the second image displayed on a second training simulator;

calculating a percentage of correlated pixel partitions of the plurality of pixel partitions of the first image displayed on a first training simulator and the corresponding plurality of pixel partitions of the second image displayed on a second training simulator; and determining that the first image displayed on a first training simulator and the second image displayed on a second training simulator are correlated images if the percentage of correlated pixel partitions exceeds a predetermined pixel partition correlation threshold.

16. The system of claim 15, wherein partitioning a first image displayed on a first training simulator into a plurality of corresponding pixel partitions and partitioning a second image displayed on a second training simulator into a plurality of corresponding pixel partitions further comprises, partitioning the first image and the second image into a 49×49 matrix or a 23×23 matrix of pixel partitions.

17. The system of claim 15, wherein the predetermined number of pixels in each of the plurality of pixel partitions is an equal number of pixels.

18. The system of claim 15, wherein calculating an average luminance value for each of the plurality of pixel partitions of the first image displayed on a first training simulator further comprises:

calculating a pixel luminance value for each of the pixels in each of the plurality of pixel partitions of the first image displayed on a first training simulator; and calculating the average luminance value for each of the plurality of pixel partitions of the first image displayed on a first training simulator as equal to the sum of the pixel luminance values of the pixels in the pixel partition divided by the predetermined number of pixels in the pixel partition.

19. The system of claim 15, wherein calculating an average luminance value for each of the plurality of pixel partitions of the second image displayed on a second training simulator further comprises:

calculating a pixel luminance value for each of the pixels in each of the plurality of pixel partitions of the second image displayed on a second training simulator; and calculating the average luminance value for each of the plurality of pixel partitions of the second image displayed on a second training simulator as equal to the sum of the pixel luminance values of the pixels in the pixel partition divided by the predetermined number of pixels in the pixel partition.

20. The system of claim 15, wherein determining if each of the plurality of pixel partitions of the first image displayed on a first training simulator is correlated with each of the corresponding plurality of pixel partitions of the second image displayed on a second training simulator further comprises:

comparing the average luminance value of each of the plurality of pixel partitions of the first image displayed on a first training simulator with the average luminance value of each of the corresponding plurality of pixel partitions of the second image displayed on a second training simulator; and assigning a first percent correlation value to the pixel partition if a difference is detected in the comparison of the average luminance values and assigning a second percent correlation value to the pixel partition if a difference is not detected in the comparison of the average luminance values.

\* \* \* \* \*